US008983985B2

(12) United States Patent
Chen et al.

(10) Patent No.: US 8,983,985 B2
(45) Date of Patent: Mar. 17, 2015

(54) MASKING SENSITIVE DATA OF TABLE COLUMNS RETRIEVED FROM A DATABASE

(75) Inventors: Stephen Yao Ching Chen, Saratoga, CA (US); Curt L. Cotner, Gilroy, CA (US); Gerald G. Kiernan, San Jose, CA (US); Irene Ching-Hua Liu, San Jose, CA (US); Claire W. McFeely, San Jose, CA (US); Walid Rjaibi, Markham, CA (US); Timothy J. Vincent, Toronto, CA (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 13/016,010

(22) Filed: Jan. 28, 2011

(65) Prior Publication Data

US 2012/0197919 A1 Aug. 2, 2012

(51) Int. Cl.
*G06F 17/30* (2006.01)

(52) U.S. Cl.
CPC .......... *G06F 17/30315* (2013.01); *G06F 17/30* (2013.01)
USPC ........... 707/757; 707/754; 707/759; 707/765; 707/766; 707/769

(58) Field of Classification Search
CPC ..................................................... G06F 17/30
USPC ......... 707/690–699, 790–792, 803–805, 754, 707/757, 759, 765–766, 769; 706/45–50
See application file for complete search history.

(56) References Cited

U.S. PATENT DOCUMENTS

| 6,480,850 | B1 * | 11/2002 | Veldhuisen ................... 707/610 |
| 6,487,552 | B1 * | 11/2002 | Lei et al. ................................ 1/1 |
| 6,760,735 | B1 * | 7/2004 | Rusche ................................. 1/1 |
| 6,839,701 | B1 | 1/2005 | Baer et al. |
| 7,240,046 | B2 * | 7/2007 | Cotner et al. ................. 707/769 |
| 7,310,647 | B2 | 12/2007 | Lei et al. |
| 7,711,741 | B2 | 5/2010 | Lawler et al. |
| 7,877,398 | B2 * | 1/2011 | Kroeschel et al. ............ 707/757 |
| 7,882,134 | B2 | 2/2011 | Pattabhi et al. |

(Continued)

FOREIGN PATENT DOCUMENTS

| WO | WO 00/36535 | * | 6/2000 |
| WO | WO 2004066128 | * | 8/2004 |

OTHER PUBLICATIONS

Net 2000 Ltd "Data Masking: What You Need to Know", What You Really Need to Know Before You Begin, A Net 2000 Ltd. White Paper, published 2010, pp. 1-22.*

(Continued)

*Primary Examiner* — Srirama Channavajjala
(74) *Attorney, Agent, or Firm* — Mohammed Kashef; Edell, Shapiro & Finnan, LLC

(57) ABSTRACT

Access to a data element stored within a database object is controlled. A request is received from a user to perform an operation in relation to the database object, the operation including retrieval of information from the data element of the database object. Prior to retrieving information from the data element, a determination is made whether at least a portion of the information from the data element is subject to masking in accordance with an access policy. In response to determining that information from the data element is subject to masking, the request is modified to require that information from the data element be retrieved in a masked condition.

18 Claims, 3 Drawing Sheets

(56) References Cited

U.S. PATENT DOCUMENTS

| | | |
|---|---|---|
| 7,974,942 B2 | 7/2011 | Pomroy et al. |
| 2002/0095405 A1* | 7/2002 | Fujiwara .......................... 707/3 |
| 2003/0014394 A1 | 1/2003 | Fujiwara et al. |
| 2004/0139043 A1* | 7/2004 | Lei et al. .......................... 707/1 |
| 2005/0132377 A1* | 6/2005 | Byrne et al. ................... 718/101 |
| 2005/0144176 A1* | 6/2005 | Lei et al. ...................... 707/100 |
| 2005/0198043 A1* | 9/2005 | Gruber et al. ................. 707/100 |
| 2005/0289342 A1 | 12/2005 | Needham et al. |
| 2006/0074897 A1* | 4/2006 | Fergusson ......................... 707/4 |
| 2006/0248592 A1 | 11/2006 | Agrawal et al. |
| 2007/0110224 A1 | 5/2007 | Gumpel et al. |
| 2007/0136245 A1 | 6/2007 | Hess et al. |
| 2007/0136291 A1 | 6/2007 | Bird et al. |
| 2007/0156691 A1 | 7/2007 | Sturms et al. |
| 2008/0034357 A1* | 2/2008 | Gschwind ..................... 717/149 |
| 2008/0065665 A1* | 3/2008 | Pomroy et al. ................ 707/101 |
| 2009/0049511 A1* | 2/2009 | Manickam et al. ................ 726/1 |
| 2009/0100527 A1* | 4/2009 | Booth et al. ..................... 726/27 |
| 2009/0132419 A1 | 5/2009 | Grammer et al. |
| 2009/0204631 A1 | 8/2009 | Pomroy et al. |
| 2009/0271361 A1* | 10/2009 | Pattabhi et al. ................... 707/2 |
| 2009/0281974 A1* | 11/2009 | Saxena et al. ................... 706/14 |
| 2010/0027367 A1 | 2/2010 | Manning |
| 2010/0030795 A1 | 2/2010 | Pattabhi et al. |
| 2010/0042643 A1* | 2/2010 | Pattabhi et al. ............... 707/102 |
| 2010/0114831 A1 | 5/2010 | Gilbert et al. |
| 2010/0146120 A1 | 6/2010 | Anipko et al. |
| 2010/0161995 A1* | 6/2010 | Browning ..................... 713/189 |
| 2010/0205189 A1 | 8/2010 | Ebrahimi et al. |
| 2012/0197919 A1 | 8/2012 | Chen et al. |
| 2012/0317073 A1 | 12/2012 | Zhou et al. |

OTHER PUBLICATIONS

Kulkarni et al., "Automated Analysis of Data Masking Activity", TACTiCS TCS Technical Architects Conference '07, 2007.

Yee et al., "Masked Queries for Search Accuracy in Peer-to-Peer File Sharing Systems", IPDPS IEEE International Conference on, Mar. 26-30, 2007, pp. 1-10.

IBM et al.; "Data Masking Method for Secured Data", IPCOM0001852151D, Jul. 17, 2009, 5 pages.

Agrawal et al., "Extending Relational Database Systems to Automatically Enforce Privacy Policies", 2005, 10 pages.

* cited by examiner

MASKING SENSITIVE DATA OF TABLE COLUMNS RETRIEVED FROM A DATABASE

BACKGROUND

1. Technical Field

The present invention relates to accessing information from a database and, in particular, masking of sensitive data located in columns of a database table, where the output of the sensitive data is masked based upon user access to such data.

2. Discussion of the Related Art

Preventing unauthorized users from retrieving column-level information when such persons have no business need to see the data is an extremely important and difficult database task. In many scenarios, it is desirable to prevent or restrict specific users from accessing column-level information, while allowing other users access to that information within a database table. For example, in a scenario in which employee information is provided for all employees of a company, where the columns of table include employee social security number, salary, and other relevant information about the employee (such as employee age, department, home address information, etc.), it may be desirable to restrict access to certain columns of information (e.g., salary information, social security number information, etc.) to only those people authorized to receive such information (e.g., managers, payroll department employees, etc.) but prevent other unauthorized people from receiving that information. While there may be an access rule for information retrieval, users should be able to perform certain other tasks (such as INSERT, UPDATE, or DELETE tasks) in the database table. Articulating such column-level access control rules using the power of SQL is an interesting and challenging database topic.

BRIEF SUMMARY

Accordingly, embodiments of the present invention include a method, a computer program product and a system for controlling access to a data element stored within a database object. A request is received from a user to perform an operation in relation to the database object, the operation including retrieval of information from the data element of the database object. Prior to retrieving information from the data element, a determination is made whether at least a portion of the information from the data element is subject to masking in accordance with an access policy and, in response to determining that information from the data element is subject to masking, the request is modified to require that information from the data element be retrieved in a masked condition.

The present invention provides a number of useful features including, without limitation, the preventing or restricting of specific users from accessing column-level information, while allowing other users access to that information within a database table, by providing column-level access control using SQL.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

Figure 1A:
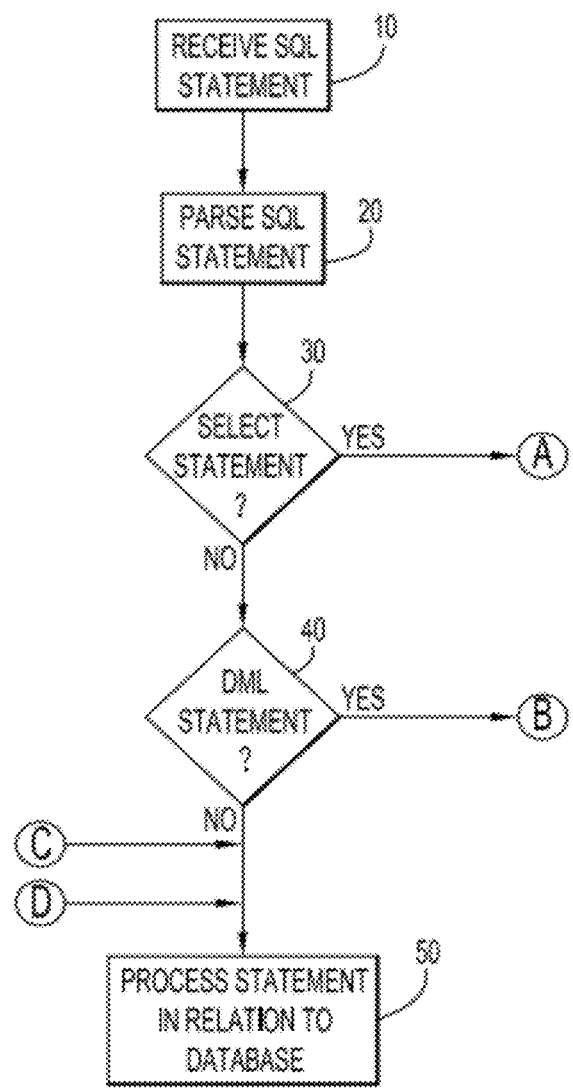
FIGS. 1A, 1B and 1C provide a flowchart depicting an example method of pre-processing an SQL statement, including SQL queries and DML statements, to apply masking as necessary during database operations according to an embodiment of the present invention.

In accordance with embodiments of the present invention, a method, system and computer program product provide pre-processing of a database command to query and/or update data within a database table, where at least some data is sensitive and restricted to access by authorized persons. In particular, the embodiments of the present invention can precisely query and retrieve sensitive data from a database while masking such sensitive data for persons not authorized to view such sensitive data and further preventing extraction of such sensitive data by such unauthorized persons for the purpose of inserting or updating the sensitive data into another table.

Column-level access control in Fine-grained access control (FGAC) in a database, such as a relational database management system (RDBMS), can be implemented utilizing the example embodiments of the present invention as described herein by initially setting up column mask requirements for a table. The row-level access control in FGAC can be implemented utilizing a row permission for the table. A row permission is a database object that expresses a row access control rule for a specific table. An example embodiment of row-level access control is described in U.S. Patent Application Publication No. 2006/0248592, the disclosure of which is incorporated herein by reference in its entirety.

Column masking is utilized in the example embodiments to restrict access to sensitive data to authorized persons. A column mask is a database object that expresses a column access control rule for a specific column. The column mask is implemented in the form of an SQL CASE expression in a CREATE MASK statement, that describes under what conditions a defined person or group of persons can receive values returned for a column in an unmasked or masked result. Multiple column masks can be created for a table. The definition of a column mask can reference a user, role, or group in the CASE expression. The CASE expression can mask the stored column value before returning it to the application and can also determine how the value should be returned depending on runtime conditions.

Column masking can be implemented to affect values that are returned to the user or to the application issuing a SELECT statement. For example, in a scenario in which a database table includes a column of data providing customer information and a column of data providing credit card number information, the credit card column of data may include a mask allowing access to all persons only those credit card numbers that have expired. If a credit card number has not expired, the column mask provides only the last four digits for active credit card numbers to all persons. Users that are part of the billing group can see current credit card numbers unmasked. The column mask can be implemented using the following SQL statement:

CREATE MASK CardMask ON CUSTOMER
    FOR COLUMN CARD RETURN CASE WHEN EXPIRATION <
    CURRENT DATE
        THEN CARD
        WHEN VERIFY_GROUP_FOR_USER(SESSION_USER, -continued

```
        'BILLING')
    THEN CARD
    ELSE CHAR('XXXXXXXXXXXX-') ||
        SUBSTR(CARD,13,4)
    END
ENABLE
```

Assuming column masking has been activated on the CUSTOMER table and the following SQL query retrieves customer credit card numbers for customers with credit card numbers that start with "1234":
SELECT CARD FROM CUSTOMER WHERE CARD LIKE '1234%'

The CREATE MASK statement results in a pre-processing of the SELECT query to ensure that values returned from the query are subject to masking. As described in greater detail below, the pre-processing of SQL statements, such as SELECT statements, implements masking of sensitive data within the statement prior to accessing the data from the database. The column mask ensures that, for general users, only expired cards will have their full numbers returned, while only the last four digits will appear for active cards. Customers in the BILLING group retrieve unmasked card numbers regardless of whether a card is active or expired. In the example above, the VERIFY_GROUP_FOR_USER function checks if the user issuing the query, represented by the special register SESSION_USER, is a member of group BILLING. In addition, the pre-processing of the SQL SELECT statement for column masking only affects values returned from a SELECT statement, while the usage of the CARD column in the predicate is unaffected by column masking. In other words, all customer cards starting with "1234" will still be selected by the query. Column masking as a result of the pre-processing of the SQL statement allows the database system itself to perform the task of masking sensitive values returned to a user or application without affecting a user's ability to accurately filter the data based upon sensitive values.

Figure 1B:
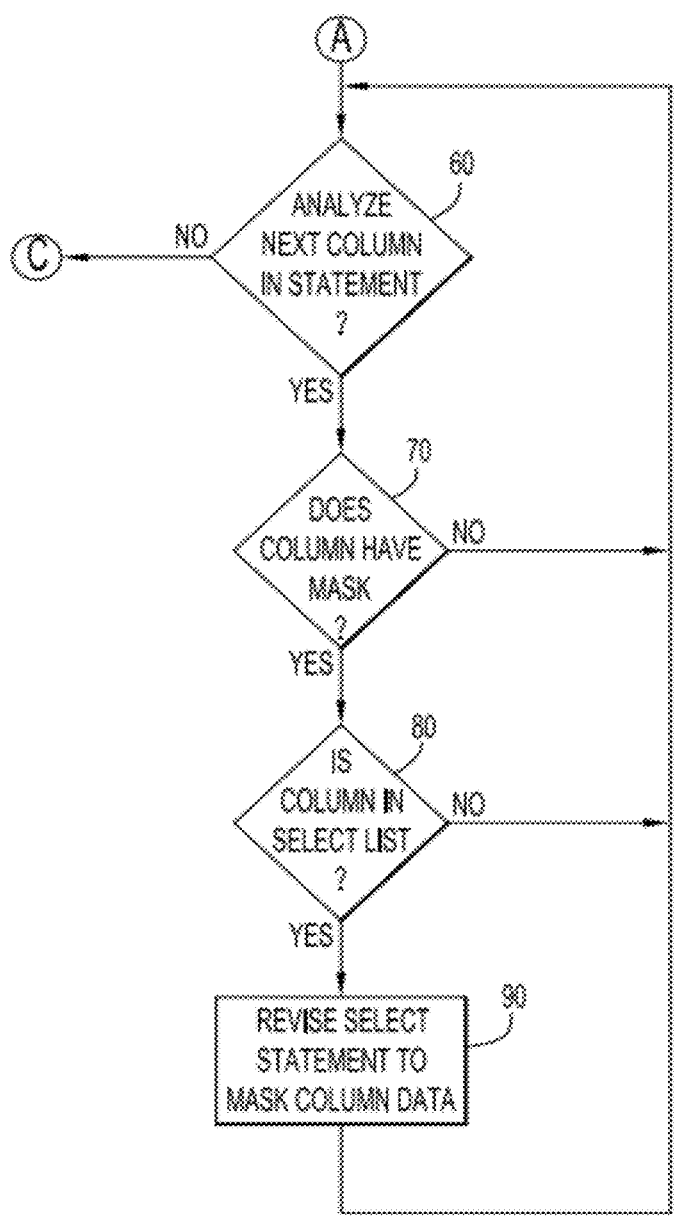
Figure 1C:
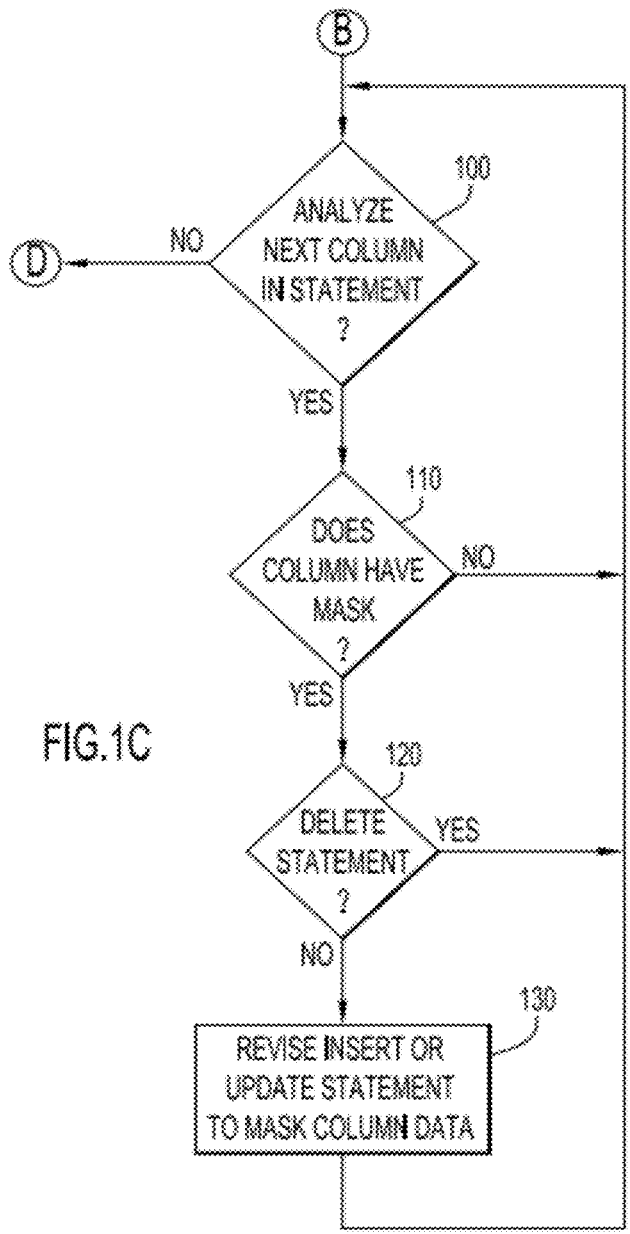

A flowchart of an example method in accordance with the present invention for column masking by pre-processing an SQL statement is illustrated in FIGS. 1A-1C. Referring to FIG. 1A, the server for a database receives an SQL statement input by a user (step 10). The database server parses the statement for semantic analysis (Step 20). The database server determines whether the SQL statement includes a query in the form of a SELECT statement (step 30). If there is a SELECT statement, the processing steps proceed to those set forth in FIG. 1B. If the database server instead determines that there is a data manipulation language (DML) statement, such as INSERT, UPDATE or DELETE (step 40), the processing steps proceed to those set forth in FIG. 1C. If the statement is neither a SELECT nor a DML statement, the statement is processed against the database (step 50).

Referring to FIG. 1B, upon determination of a SELECT statement, all columns referenced in the SELECT query are analyzed by database catalog lookups so as to identify which columns are subject to column masking. In particular, the database processor determines whether another column in the statement needs to be analyzed (step 60). If no further column in the statement needs to be analyzed, the process returns to step 50 in FIG. 1, where the statement is processed against the database.

If the column in the statement needs to be analyzed, the processor determines whether this column has a mask assigned to it (step 70), for example, based upon whether a CREATE MASK statement was previously defined on this column. If there is no column mask associated with this column, the process proceeds to the next column for analysis (back to step 60). If this column does have a mask assigned to it, the processor next determines whether the column contributes to the outer-most select list (step 80). In other words, the processor determines at this step whether this column includes data that is in the result/output of the user SELECT query. If the column is not retrieved by the SELECT statement, the process proceeds to the next column for analysis (back to step 60). If the column is retrieved by the SELECT statement for the output, the processor modifies the SELECT statement to achieve masking of column data in accordance with masking criteria (step 90), for example, via masking criteria as set forth in the CREATE MASK statement. The process then proceeds to step 60 (determining whether another column in the statement needs to be analyzed).

Thus, the process of FIG. 1B pre-processes a SELECT statement by modifying the SELECT statement as necessary to mask columns in the table including sensitive data prior to such data being retrieved and output to a user who does not have authorized access to such sensitive data.

Referring to FIG. 1C, upon determination of a DML statement, all columns referenced in the DML statement are analyzed by database catalog lookups so as to identify which columns are subject to column masking. In particular, the database processor determines whether another column in the referenced database table needs to be analyzed (step 100). If no further column needs to be analyzed, the process returns to step 50 in FIG. 1, where the statement is processed against the database.

If the column needs to be analyzed, the processor determines whether this column has a mask assigned to it (step 110), for example, based upon whether a CREATE MASK statement was previously defined on this column. If there is no column mask associated with this column, the process proceeds to the next column for analysis (back to step 100). If this column does have a mask assigned to it, the processor next determines whether this column is being processed with a DELETE statement (step 120). If the column is being processed with a DELETE statement, the process proceeds to the next column in the statement for analysis without making any modification to the statement. In other words, column masks have no effect on DELETE statements.

If the column subject to masking is not associated with a DELETE statement, and the statement type associated with the column is either an INSERT from subselect or UPDATE with subselect statement, the statement is modified to apply column masking to this column in the subselect with respect to such an INSERT or UPDATE statement (Step 130). Thus, the pre-processing of the INSERT or UPDATE statement results in a modification of the statement to implement column masking prior to retrieval of the data from the database. The process then returns to determine whether another column in the statement needs to be analyzed (step 100).

The process as set forth in FIGS. 1A-1C processes SQL SELECT queries and DML statements by intercepting the statement after it is parsed in order to modify it for the purpose of column masking. The modified statement is then compiled, optimized, and evaluated, where any column masking operation is computed as part of the evaluation process. Designing and implementing column masking as a pre-processing step offers the full power of SQL for the purpose of column masking. The decision to mask a column value can be data dependent and vary for each value. By implementing column masking in the SQL statement (i.e., by pre-processing the SQL statement to include column masking), the modified statement takes advantage of database optimization and all other database processing features.

The use of pre-processing to implement column masking requires much more complicated pre-processing algorithms in comparison to general filtering of sensitive data (i.e., filtering that is independent of the usage of a column in a statement) using inline views (where a database table reference in a statement is substituted with a view that implements the filtering). For example, by pre-processing an INSERT from subselect statement to implement column masking, the column masking only affects the outermost select list of the subselect, while other uses of a masked column can remain unaffected by the masking.

In addition, the semantics of column masking for DML statements simply cannot be implemented using updatable inline views. For example, in a scenario involving an insert operation, the pre-processing of SQL statements in accordance with the present invention can permit insertion of a row of data input by a user into a table regardless of whether there are column masks in the table. However, in the scenario of INSERT from a subselect, in which source columns of one table are referenced in a subselect operation for insertion into another table, and such source columns are subject to masking, the sensitive data in the source columns are subject to masking (this is implemented as a result of the pre-processing and modifications to the INSERT statement, since those source columns have been identified as subject to masking). The INSERT process will compare the values in each column after masking with those in the corresponding source column prior to masking. If the masked column values do not match the unmasked source column values, the INSERT operation will fail (e.g., an error condition will be raised since the user is attempting to insert sensitive data from a table that the user is not authorized to access). Thus, the user must be able to access unmasked column values from a table in order to use such columns to derive values for inserts.

The same restriction can be applied to UPDATE statements, where a masked column is unaffected by a user updating a row having a column subject to masking with data input by the user. However, if the user attempts to access data from a column subject to masking for the purpose of deriving data for performing updates, the pre-processing of the SQL statement will modify the statement to prevent the access to such sensitive data if the user is not authorized to access this sensitive data.

Controlling access to sensitive data subject to column masking using DML statements such as INSERT and UPDATE cannot be accomplished using updatable inline views. The pre-processing of SQL statements in accordance with the present invention ensures that an unauthorized user does not (intentionally or unintentionally) retrieve such sensitive data when performing such DML statements.

A number of examples are now described herein which implement the pre-processing of SQL statements to achieve column masking of sensitive information in accordance with the present invention.

In one example, a company may wish to retrieve a list of its employees including information such as employee income, social security number, employee home address, etc. A column mask may be defined for controlling access to columns values for employees based upon the user's position within the organization. The general syntax for generating a statement for creating a column mask is:

```
CREATE MASK [mask-name] ON [table-name] AS [correlation-name]
FOR COLUMN [column-name] RETURN [case-expression]
ENABLE
```

The statement defines a column mask on a column of a table. The table name or its correlation name can appear in the case-expression. The case-expression is a standard SQL case expression that implements the mask and can conditionally return alternative masked values. The ENABLE key word enables the column mask. As example mask creating statement is provided below:

```
CREATE MASK SSN_MASK ON EMPLOYEE
    FOR COLUMN SSN RETURN
        CASE WHEN
        (VERIFY_GROUP_FOR_USER(SESSION_USER,
        'PAYROLL') = 1)
            THEN SSN
        CASE WHEN
        (VERIFY_GROUP_FOR_USER(SESSION_USER,
        'MANAGER') = 1
AND EMPLOYEE.MGRID = (SELECT M.ID FROM
EMPLOYEEMAP M WHERE M.USER = SESSION_USER))
            THEN CHAR('XXX-XX-') || SUBSTR(SSN,8,4)
        ELSE NULL
    END
ENABLE
```

This statement defines a column mask called SSN_MASK on column SSN of table EMPLOYEE which returns the plain value of a social security number if the value in SESSION_USER belongs to the 'PAYROLL' group, or returns the last four digits of a social security number if the value in SESSION_USER belongs to the 'MANAGER' group and the employee is his/her direct report, otherwise returns a null value. The EMPLOYEEMAP table maps the value in SESSION_USER to EMPLOYEE IDs which can then be used to locate the manager in the employee table. Column ID uniquely identifies each employee in the EMPLOYEE table. This statement creates the mask, but access to the column value is regulated by the mask when column access control is activated on the table, using the following statement:
ALTER TABLE EMPLOYEE ACTIVATE COLUMN ACCESS CONTROL This statement enforces all column masks defined on columns of table EMPLOYEE. After the transaction containing this statement is committed, masked values of column SSN will be returned.

In this scenario, assume an employee from the 'MANAGER' group issues the following SELECT statement:
SELECT SSN FROM EMPLOYEE As a result of the column mask created by the previous CREATE MASK statement, the employee from the 'MANAGER' group would be allowed to see the last four digits only of the social security numbers for his/her direct reports and null values for other employees. In contrast, an employee from 'PAYROLL' would see all of the social security numbers unmasked, while all other employees would not see any portion of the social security numbers, and would instead receive a null value.

As noted above, column mask scenarios present challenges for DML statements such as INSERT from a subselect and UPDATE with a subselect that cannot be solved by relying on existing updatable inline view semantics and their implementation techniques. As further noted above, for inserts into tables protected by column masks, a row can be inserted into the table regardless of column masks defined on any of the columns of the inserted table. While column masks on target columns of an INSERT statement can be ignored, the same does not hold for source columns with column masks that are used to derive values for inserts. As noted above, and as shown in the flowchart of FIGS. 1A-1C, the values obtained from source columns subject to masking may be returned as masked values for insertion into the target columns (depending upon the user's group of access to the sensitive information in such masked source columns). The value of the column after applying the mask which is used for insert must be equal to the value of the column without a mask. If the values are not the same, the insert operation fails. Thus, for the above scenario, the only group of employee that would be allowed to perform an INSERT operation with social security numbers being selected from source columns would be a 'PAYROLL' employee, since the social security numbers for all other employees would be returned masked (or as NULL) for all other employees. Thus, consider the following statement:
INSERT INTO EMPLOYEE_TEMP SELECT SSN FROM EMPLOYEE This INSERT statement would only be successful if an employee from the 'PAYROLL' group issues the statement, because the column mask applied on SSN returns the same values as the source column values. However, if an employee from the 'MANAGER' group issues the statement, the INSERT statement fails because the column mask applied on SSN does not return the same values as the unmasked column values. The same holds for all other employees.

The same restriction applies for UPDATE statements. In particular, as with INSERT statements, column masks on columns that are the targets of update assignments are ignored. However, the same properties applied for inserts are also applied for columns subject to column masks that are used to derive source values for updates. Consider the following example statement:

```
UPDATE EMPLOYEE_TEMP SET SSN = SELECT SSN FROM
  EMPLOYEE WHERE
  EMPLOYEE_TEMP.ID = EMPLOYEE.ID
```

Column ID is assumed to be primary key of both tables in the above update example. This UPDATE statement is successful if an employee from the 'PAYROLL' group issues the statement, because the column mask applied on SSN in the subselect returns the unmasked values as the column values. However, if an employee from the 'MANAGER' group (or any other group) issues the statement, the UPDATE statement fails because the column mask applied on SSN in the subselect does not return the same values as the unmasked column values.

As further noted above, DELETE statements are unaffected by column masking.

Column masking for the EMPLOYEE table in the previous example can be deactivated by the following SQL statement:
ALTER TABLE EMPLOYEE DEACTIVATE COLUMN ACCESS CONTROL This ALTER statement removes the enforcement of column masking on all columns of table EMPLOYEE. After the transaction containing this statement is committed, the column SSN is no longer regulated by the column mask.

In addition, a column mask can be created to simply validate the CREATE MASK statement for syntax and semantics, where the statement is disabled so as to have no impact on regulating access to the column values of tables.

```
CREATE MASK mask-name ON table-name AS correlation-name
  FOR COLUMN column-name RETURN case-expression
  DISABLE
```

However, after validation of the statement is achieved, the statement can be altered as enabled so that the column mask can now control access to sensitive data. For example, the following statement enables the column mask:
ALTER MASK mask-name ENABLE After the transaction containing this statement is committed, the column mask becomes effective immediately to govern access to column values in 'mask-name' if the column-level access control has been activated for the subject table.

The next examples illustrate pre-processing of an SQL statement that is subject to masking utilizing a method set forth in the flowchart of FIGS. 1A-1C. These examples all relate to an employee table created with the columns of data including employee birthdate, employee salary, employee bonus and employee name, address, and MGRID where column masks are to be applied for columns SSN, SALARY and BONUS. A sample statement for creating this table is as follows:

```
CREATE TABLE T1 (ID CHAR(5) NOT NULL,
  LASTNAME VARCHAR(128),
  FIRSTNAME VARCHAR(128),
  SSN CHAR(11) NOT NULL,
  BDATE DATE NOT NULL,
  SALARY DEC(8,2) NOT NULL,
  BONUS DEC(8,2) NOT NULL,
  ADDRESS VARCHAR(128),
  MGRID CHAR(5))
```

The following example SQL statement shows a query with two output columns using three masked columns.
SELECT SSN, SALARY+BONUS FROM T1

Pre-processing of the SELECT statement results in a transformation or modification of this statement to the following statement incorporating column masks:
SELECT CM(SSN), CM(SALARY)+CM(BONUS) FROM T1

The first output column is a base table column that is modified during pre-processing to introduce masking for column SSN and is represented as 'CM (SSN)'. The general functional notation 'CM( )' is used in this and the following statements to indicate the application of masking to columns. It is noted that the specific details of the individual masks are not described in these examples for clarity of exposition. These CM functions represent the CASE expressions specified in the CREATE MASK statements corresponding to these columns. The second output column is an expression that involves two masked base table columns. The revised SQL statement results in a masking being applied directly to the masked columns themselves and not to the result of the expression (as in post processing of an SQL statement for masking of columns).

The next example SQL statement is as follows:

```
SELECT SSN, SALARY FROM T1
  WHERE SSN = '123456789'
```

Pre-processing of this SELECT statement results in a transformation or revision of this statement to the following statement incorporating column masks:

```
SELECT CM(SSN), CM(SALARY) FROM T1
    WHERE SSN = '123456789'
```

This example illustrates that column masking only affects the masked column contributing to the outermost select list. Thus, the masked column SSN is used unmasked in the predicate (i.e., in the 'WHERE' portion of the statement).

The next example shows the pre-processing of SQL statements with grouping and aggregation functions. Consider the following example statement:

```
SELECT COUNT(SSN), SALARY FROM T1
    GROUP BY SALARY
    HAVING SALARY > 100000
```

Assuming the column mask for SALARY references the SALARY column only, pre-processing of this SELECT statement results in a transformation or revision of this statement to the following statement incorporating column masks:

```
SELECT COUNT(CM(SSN)), CM(SALARY) FROM T1
    GROUP BY SALARY
    HAVING SALARY > 100000
```

In this example, grouping is computed on unmasked column values while the aggregate function is computed based on the masked column values, and the grouping column in the outermost select list is returned using the masked values.

If the column mask for SALARY references other columns from the same table, and those columns are not grouping columns, pre-processing of the above SELECT statement could raise an error or the implementation could choose to allow such a SELECT statement by tolerating the possible non-deterministic result. The result could be non-deterministic because the values of those columns could come from different rows in a group, thus, the value could be different in each execution.

The next example statement illustrates column masking and numbered ordering:

```
SELECT SSN, SALARY FROM T1
    ORDER BY 1
```

Pre-processing of this SELECT statement results in a transformation or revision of this statement to the following statement incorporating column masks:

```
SELECT A, B
    FROM (SELECT CM(SSN), CM(SALARY), SSN FROM T1)
        as X(A,B,C)
    ORDER BY C
```

In this example, order is computed on unmasked values but masked values of the order column is returned. In particular, the original statement computes order on SSN which is the $1^{st}$ column in the result. However, SSN is a column subject to masking. The SQL statement is transformed to mask the column values, but create an additional column for ordering (the $3^{rd}$ column in the modified statement).

The next example explains queries with distinct output rows:

SELECT DISTINCT SSN, SALARY FROM T1

Similar to the GROUP BY in the previous example, the query is modified to compute DISTINCT on unmasked values, while returning masked values as the query's result. If the column mask for SSN or SALARY references other columns from the same table, and those columns are not specified in the select list, it has the same non-deterministic result issue as the GROUP BY. In other words, if there is no functional dependency between <SSN, SALARY> and <CM(SSN),CM(SALARY)>, then the result from the DISTINCT computation can be non-deterministic. For each distinct value of <SSN, SALARY>, one value of <CM(SSN),CM(SALARY)> can be selected non-deterministically. Like GROUP BY, the implementation can choose to raise an error during pre-processing of the SELECT statement or allow such a SELECT statement by tolerating the possible non-deterministic result.

The following example shows a subquery in the select list with a masked column that contributes to the outermost select:

```
SELECT (SELECT SALARY FROM T1 FETCH FIRST ROW
    ONLY)+BONUS FROM T2
    WHERE SSN = '123456789'
```

Pre-processing of this SELECT statement results in a transformation or revision of this statement to the following statement incorporating column masks:

```
SELECT (SELECT CM(SALARY) FROM T1 FETCH FIRST ROW
ONLY)+ BONUS FROM T2
    WHERE SSN = '123456789'
```

The subquery portion (SELECT (SELECT SALARY ... )) is transformed to introduce column masking to SALARY. Since the BONUS column in this statement belongs to a different table (table T2, which is different from table T1 that defines a column mask for the BONUS column), the data from the BONUS column is not masked in the revised statement.

The next example includes an 'ORDER BY' over the result of a subquery that has a masked column:

```
SELECT (SELECT SALARY FROM T1) FROM T1
    WHERE SSN = '123456789'
    ORDER BY 1
```

Pre-processing of this SELECT statement results in a transformation or revision of this statement to the following statement incorporating column masks:

```
SELECT A
    FROM (SELECT (SELECT CM(SALARY) FROM T1),
        (SELECT SALARY FROM T1) FROM T1
        WHERE SSN = '123456789') as X(A, B)
    ORDER BY B
```

In this example, the subquery is duplicated in the modified statement to produce the masked value and to produce an unmasked value for the 'ORDER BY' operation.

The next example illustrates modifications for column masking in outer join queries:

SELECT Y.BONUS FROM T1 X LEFT JOIN T1 Y ON X.SSN=Y.SSN

Pre-processing of this SELECT statement results in a transformation or revision of this statement to the following statement incorporating column masks:

SELECT CM(Y.BONUS) FROM T1 X LEFT JOIN T1 Y ON X.SSN=Y.SSN

The masked column Y.BONUS is from the right branch of a left outer join and subject to null values due to outer join semantics. In a scenario in which BONUS is a non-nullable column, the mask definition for BONUS may not have been designed for null values. To ensure nulls, in these cases, are handled correctly, an extra CASE WHEN branch (not shown in the modified SQL statement) can be internally added in the column mask to return a null value if a null value is detected.

Further examples of column masking are now described with views (or table expressions) which may require complex transformations in order to propagate masked columns through the table expression to outerselect columns. The following view V1 is used to illustrate the next examples:

```
CREATE VIEW V1(C1) AS
    SELECT AVG(SALARY + BONUS) FROM T1 GROUP BY
    LASTNAME
```

Consider the following SQL statement:

SELECT MAX(C1) FROM V1

This query over a view is first transformed into an equivalent query over table expression that represents the view as follows:

```
SELECT MAX(V1.C1)
FROM (SELECT AVG(SALARY + BONUS) FROM T1 GROUP
    BY LASTNAME
    ) V1(C1)
```

The modified query is then transformed to introduce column masking over masked columns SALARY, and BONUS as follows:

```
SELECT MAX(V1.C1)
FROM (SELECT AVG(CM(SALARY)+CM(BONUS)) FROM T1
    GROUP BY LASTNAME
    ) V1(C1)
```

The transformations are applied in the table expression since the masked columns are used there in an addition. Therefore, the column masking cannot be applied in the outer query but must instead be applied in the table expression directly on the masked columns and before the addition.

This next example is slightly modified from the previous example:

```
            SELECT MAX(C1) FROM V1
            WHERE C1 > 100000
```

This query is again first transformed into an equivalent query over table expression that represents the view as follows:

```
SELECT MAX(V1.C1)
FROM (SELECT AVG(SALARY + BONUS) FROM T1 GROUP
BY LASTNAME
    ) V1(C1)
    WHERE V1.C1 > 100000
```

The modified query is then transformed to introduce column masking over masked columns SALARY, and BONUS as follows:

```
SELECT MAX(V1.C2)
FROM (SELECT AVG(SALARY + BONUS),
    AVG(CM(SALARY)+CM(BONUS))
        FROM T1 GROUP BY LASTNAME
    ) V1(C1, C2)
    WHERE V1.C1 > 100000
```

In the above example, a masked column is both returned and used in a predicate in the outer query. As with previous examples, the predicate is evaluated on unmasked values (i.e., the evaluation of unmasked AVG(SALARY+BONUS) value greater than 100000). The table expression is extended with an extra column to extract both masked and unmasked values for the outer query. The masked value V1.C2 is used to compute the MAX function for the result and the unmasked value V1.C1 is used in the predicate.

The following example is an INSERT statement:

```
INSERT INTO X(A,B)
    SELECT 1, SALARY+BONUS FROM T1
```

Pre-processing of these statements results in a transformation or revision to the following statements incorporating column masks:

```
INSERT INTO X(A,B)
    SELECT 1, CM(SALARY)+CM(BONUS) FROM T1
```

In this insert example, both SALARY and BONUS columns from table T1 have a column mask and both contribute source values to be inserted into the target column B of table X. The INSERT statement is transformed to introduce column masking for the assigned values. However, internal markers are maintained to identify masking outcomes. The masked values in the revised SELECT statement are compared with unmasked source values to see if they match. By tracking these outcomes, a possible error condition can be determined to indicate that the masked values are not the same as the unmasked values and the masked values are going to be inserted into table X.

A similar example is now provided with an UPDATE statement:

UPDATE T1 SET SALARY=BONUS*50

Pre-processing of this UPDATE statement results in a transformation or revision to the statement incorporating a column mask:

UPDATE T1 SET SALARY=CM(BONUS)*50

Similar to the pre-processing of the INSERT statement, a masked source value contributing to the target of an update statement must be the same as the unmasked value for the update to proceed. Otherwise, an error condition will occur. A detection of whether an masked value for BONUS is the same as the unmasked value can be identified (e.g., by comparing the retrieved BONUS value with the masked BONUS value) to determine whether to allow the UPDATE assignment is successful.

From the examples above, it can be seen that masking using query transformation cannot use inline view techniques, but instead must rely on new and non-trivial transformation techniques that must support a variety of transformational cases in order to achieve desired semantics for column masking.

Figure 2:
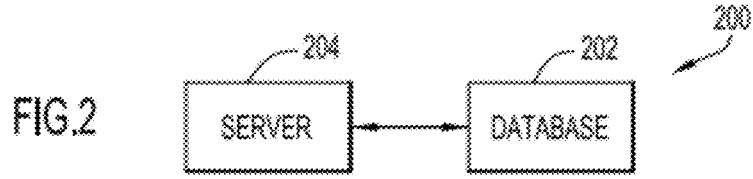
FIG. 2 is a block diagram illustrating an example server and database for performing SQL operations in accordance with the present invention.

The methods described above and depicted in the flowchart of FIGS. 1A-1C can be implemented utilizing any suitable system including hardware and software implemented in a single module or unit or, alternatively, implemented as two or more separate units. An example embodiment of a system for implementing the methods described above is schematically depicted in FIG. 2. In particular, system 200 includes a record database 202 and a server 204 that is operatively coupled to the database 202. The record database 202 and server 204 can be implemented together a single hardware unit or, alternatively, implemented in any two or more hardware units coupled together. The server 204 includes a processor that facilitates operations including, without limitation, retrieval, insertion, updates/revisions and deletion of data within the database. The server 204 can receive queries and other SQL statements in relation to the database 202 from any one or more suitable sources and/or in any suitable manner including, without limitation, via direct input of SQL statements to the server (e.g., via a server input terminal), via cloud computing to receive SQL statements, via network computing in which the server is operatively coupled to one or more other servers and/or terminals to facilitate communications therebetween (e.g., SQL statements and/or transfer of records or any other information to or from the database 202), via any suitable computer readable storage medium that includes information (e.g., magnetic, optical, floppy, DVD, CD, other non-transitory medium, etc.), and via any suitable type of carrier wave or signal for facilitating communications between the server and database and another source (e.g., bulletin board, network, LAN, WAN, Intranet, Internet, etc.).

The server and database can be any suitable computer systems implemented by any type of hardware and/or other processing circuitry. In particular, the server and database may be implemented by any quantity of conventional or other computer systems or devices (e.g., computer terminals, personal computers (e.g., IBM-compatible, Apple MacIntosh, tablet, laptop, etc.), etc.), cellular telephones, personal data assistants (e.g., Palm Pre, Droid, iPhone, etc.), etc., and may include any commercially available operating system (e.g., AIX, Android, Linux, OSX, Sun Solaris, Unix, Windows, etc.) and any commercially available or custom software (e.g., browser software, communications software, word processing software, etc.). These systems may include types of displays and input devices (e.g., keyboard, mouse, voice recognition, etc.) to enter and/or view information. In addition, record information may be received by the server and retained by the database in any suitable manner, such as the types described above.

In operation, the server 204 can retrieve information and perform inserts, updates, deletions and/or any other processing operations in relation to the database 202 utilizing the methods described above and depicted in the flowchart of FIGS. 1A-1C, where SQL statements are pre-processed by the server to ensure that sensitive information is masked for certain types of operations based upon a requesting user's authorization level to access such sensitive information.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of controlling access to a data element stored within a database object, the method comprising:
   defining one or more masks for specific portions of the database object via a masking statement of a query language;
   receiving a request in the form of a query of the query language to perform an operation in relation to the database object, the operation including retrieval of information from the data element of the database object;
   prior to retrieving the information from the data element, determining whether at least a portion of the information from the data element is subject to masking in accordance with an access policy of the masking statement; and
   in response to determining that the at least a portion of the information from the data element is subject to masking, modifying the request to invoke one or more of the defined masks of the masking statement for the information subject to masking, and processing the modified request such that the one or more defined masks of the modified request are invoked to retrieve the at least a portion of the information from the data element in a masked condition,
   wherein the modifying the request to invoke one or more of the defined masks of the masking statement only affects one or more masked columns contributing to an outermost select list.

2. The method of claim 1, wherein the access policy defines one or more mask policies for masking retrieved information, and each mask policy specifies a portion of the retrieved information to be masked and includes a condition enabling masking of the specified portion.

3. The method of claim 2, wherein each mask policy is based upon a status of a user.

4. The method of claim 1, wherein the modifying request comprises modifying the request to allow information subject to masking to be used unmasked in order to organize or filter the information based upon criteria provided in the request while preventing information subject to masking to be provided to the user unmasked.

5. The method of claim 1, wherein the data object comprises a database table including rows and columns of data, and retrieved information to be masked includes at least one column of data.

6. The method of claim 1, Wherein the request comprises selecting source information from the data element for insertion into a target data element, and the method further comprises:
   providing a notification when any source information is subject to masking.

7. A computer program product for processing operations to control access to a data element stored within a database object, the computer program product comprising:
   a computer readable storage medium having computer readable program code embodied therewith, the computer readable program code configured to:
   define one or more masks for specific portions of the database object via a masking statement of a query language;

receive a request in the form of a query of the query language to perform an operation in relation to the database object, the operation including retrieval of information from the data element of the database object;

prior to retrieving the information from the data element, determine Whether at least a portion of the information from the data element is subject to masking in accordance with an access policy of the masking statement; and in response to determining that the at least a portion of the information from the data element is subject to masking, modify the request to invoke one or more of the defined masks of the masking statement for the at least a portion of the information subject to masking, and process the modified request such that the one or more defined masks of the modified request are invoked to retrieve the at least a portion of the information from the data element in a masked condition, wherein the modifying the request to invoke one or more of the defined masks of the masking statement only affects one or more masked columns contributing to an outermost select list.

8. The computer program product of claim 7, wherein the computer readable program code is configured to implement an access policy that defines one or more mask policies for masking retrieved information, and each mask policy specifies a portion of the retrieved information to be masked and includes a condition enabling masking of the specified portion.

9. The computer program product of claim 8, wherein each mask policy is based upon a status of a user.

10. The computer program product of claim 7, wherein the computer readable program code is configured to modify the request to allow information subject to masking to be used unmasked in order to organize or filter the information based upon criteria provided in the request while preventing information subject to masking to be provided to the user unmasked.

11. The computer program product of claim 7, wherein the data object comprises a database table including rows and columns of data, and retrieved information to be masked includes at least one column of data.

12. The computer program product of claim 7, wherein the request comprises selecting source information from the data element for insertion into a target data element, and the computer readable program code is further configured to:
provide a notification when any source information is subject to masking.

13. A system for processing operations to control access to a data element stored within a database object, the system comprising:
a database including a database object configured to store database elements; and
a processor configured with logic to:
define one or more masks for specific portions of the database object via a masking statement of a query language;

receive a request in the form of a query of the query language to perform an operation in relation to the database object, the operation including retrieval of information from the data element of the database object;

prior to retrieving the information from the data element, determine whether at least a portion of the information from the data element is subject to masking in accordance with an access policy of the masking statement; and in response to determining that the at least a portion of the information from the data element is subject to masking, modify the request to invoke one or more of the defined masks of the masking statement for the at least a portion of the information subject to masking, and process the modified request such that the one or more defined masks of the modified request are invoked to retrieve the at least a portion of the information from the data element in a masked condition, wherein the modifying the request to invoke one or more of the defined masks of the masking statement only affects one or more masked columns contributing to an outermost select list.

14. The system of claim 13, wherein the processor is configured to implement an access policy that defines one or more mask policies for masking retrieved information, and each mask policy specifies a portion of the retrieved information to be masked and includes a condition enabling masking of the specified portion.

15. The system of claim 14, wherein each mask policy is based upon a status of a user.

16. The system of claim 13, wherein the processor is configured to modify the request to allow information subject to masking to be used unmasked in order to organize or filter the information based upon criteria provided in the request while preventing information subject to masking to be provided to the user unmasked.

17. The system of claim 13, wherein the data object comprises a database table including rows and columns of data, and retrieved information to be masked includes at least one column of data.

18. The system of claim 13, wherein the request comprises selecting source information from the data element for insertion into a target data element, and the processor is further configured to:
provide a notification when any source information is subject to masking.

* * * * *